United States Patent [19]

Bobbi et al.

[11] Patent Number: 5,632,346

[45] Date of Patent: May 27, 1997

[54] SELF-CENTERING DEVICE FOR QUICK HOOKING AND RELEASE OF FARM TOOLS PROVIDED WITH A HYDRAULIC HOISTER

[76] Inventors: Armando Bobbi; Alfredo Bobbi, both of No. 41, Via delle Treie, Narni, Italy

[21] Appl. No.: 510,843

[22] Filed: Aug. 3, 1995

[51] Int. Cl.⁶ .................................................. A01B 59/043
[52] U.S. Cl. ............................ 172/443; 172/272; 172/439
[58] Field of Search ................................ 172/439, 450, 172/272, 47, 249, 443, 444, 451, 776; 37/231, 232; 180/53.2, 53.3; 280/416; 403/334, 361

[56] References Cited

U.S. PATENT DOCUMENTS

| | | | |
|---|---|---|---|
| 2,743,117 | 4/1956 | Hutchings | 172/439 |
| 2,888,995 | 6/1959 | Sorensen. | |
| 3,151,883 | 10/1964 | Stuart | 172/439 X |
| 3,306,630 | 2/1967 | Weiste | 172/272 |
| 3,379,457 | 4/1968 | Restall et al. | 172/272 |
| 3,432,184 | 3/1969 | Tweedy | 172/272 |
| 4,477,101 | 10/1984 | Nilsson et al. | 172/272 |
| 5,193,623 | 3/1993 | Burette | 172/439 |

FOREIGN PATENT DOCUMENTS

| | | | |
|---|---|---|---|
| 653640 | 12/1962 | Canada | 172/272 |
| 568854 | 11/1993 | European Pat. Off. | 172/439 |
| 4307845 | 9/1994 | Germany | 172/439 |
| 670739 | 7/1989 | Switzerland | 172/439 |
| 793436 | 1/1981 | U.S.S.R. | 172/272 |
| 976874 | 12/1982 | U.S.S.R. | 172/439 |
| 1083936 | 4/1984 | U.S.S.R. | 172/272 |
| 1103555 | 2/1968 | United Kingdom. | |
| 1110361 | 4/1968 | United Kingdom | 172/272 |
| 1568052 | 5/1980 | United Kingdom | 172/272 |

*Primary Examiner*—Dave W. Arola
*Assistant Examiner*—Robert Pezzuto
*Attorney, Agent, or Firm*—Beveridge, DeGrandi, Weilacher & Young, LLP

[57] ABSTRACT

A self-centering device for quick hooking and release of farm tools on to and off of a tractor provided with a hydraulic hoister. The device includes a first substantially triangular male element preferably coupled to the tractor, a second substantially triangular female element preferably coupled to the farm tool to be hooked. The first and second substantially triangular elements are coupable to each other and a coupling and releasing mechanism for coupling and releasing the two elements is provided, and is operable directly from the tractor.

18 Claims, 1 Drawing Sheet

SELF-CENTERING DEVICE FOR QUICK HOOKING AND RELEASE OF FARM TOOLS PROVIDED WITH A HYDRAULIC HOISTER

BACKGROUND OF THE INVENTION

The present invention relates to a self-centering device for quick hooking and release of farm tools onto and off a tractor provided with a hydraulic hoister.

More particularly, the invention relates to a device of the above kind that allows one to remarkably improve the hooking and release of farm tools to the tractor provided with a hydraulic hoister.

Today, for this kind of work, rather complex apparatuses exist. These apparatuses do not allow one shot hooking.

At present, the main drawback is due to the fact that the tractor driver in order to hook the tool on the three usual hooking points is obliged, if alone, to get on and to get off more than once from the driving seat and to make numerous adjustment of the coupling devices.

Further, the worker must perform a certain number of operations in order to put the tractor and the tool along the same axis, said tool having previously been left (at the moment of releasing after the previous use) conveniently in a flat position. Otherwise, it is necessary to manually arrange the same with the consequent drawbacks due to the remarkable weights and to the often asymmetrical constructive shapes.

Thus, summarizing, the present hooking requirements often necessitate the presence of two workers, introduce the risk of injuries, involve a remarkable waste of time (four or five minutes or even more), and require a great deal of manipulation to place the tool both horizontally and vertically aligned with the tractor.

SUMMARY OF THE INVENTION

The device proposed according to the present invention eliminates the above drawbacks, provoking the coupling of the tool by the simple lifting of the tractor hydraulic hoister, even if the two elements are not perfectly aligned on the same plane (the solution allows a misalignment of up to 11 degrees) and laterally out of alignment (even of an angle of 18 degrees).

Further, the solution according to the invention, employing a third hooking hydraulically adjustable point, allows for an out of plane angle, acceptable for the hooking operation, of up to 30 degrees or more.

It is therefore a specific object of the present invention to provide a self-centering device for quick hooking and release of farm tools onto and off of a tractor provided with a hydraulic hoister. In so doing, the present invention comprises a first substantially triangular male element, preferably coupled to said tractor, a second substantially triangular female element, preferably coupled to said farm tool to be hooked, said first and second substantially triangular elements being coupable to each other in a fixed joint relationship by the effect of the weight of the same tool to be hooked, coupling and releasing means of said two elements of the present invention also being provided so as to be operable directly from the tractor such that the driver need not get on and off the tractor as in the prior art.

Preferably, according to the invention, said first and second substantially triangular elements employ C-sectioned bars, having an opened wing arrangement with one element featuring a pair of the C-sectioned bars coupled by electrowelding.

Further, according to the invention, said first substantially triangular element is coupled to the tractor by three fixing plates.

Still according to the invention, said second substantially triangular element is coupled to the tractor by three fixing plates.

Still according to the invention, said second substantially triangular element is coupled to the tool to be hooked and released by three couplings, particularly adapter bolted plates and/or pins.

Always according to the invention, said coupling and releasing means can be made up of a latch pin provided on said first substantially triangular element.

There can further be provided a series of adaptor universal plates and/or bolted extensions, which allow for the use of the device with any brand, kind and size of tractor, having any power, and the application to any farm tool having standard couplings of the different sizes.

BRIEF DESCRIPTION OF THE DRAWINGS

The present invention will now be described for illustrative, but not limitative purposes, according to its preferred embodiments, with particular reference of the figures of the enclosed drawings, wherein.

DETAILED DESCRIPTION OF THE PREFERRED EMBODIMENTS

Figure 1:
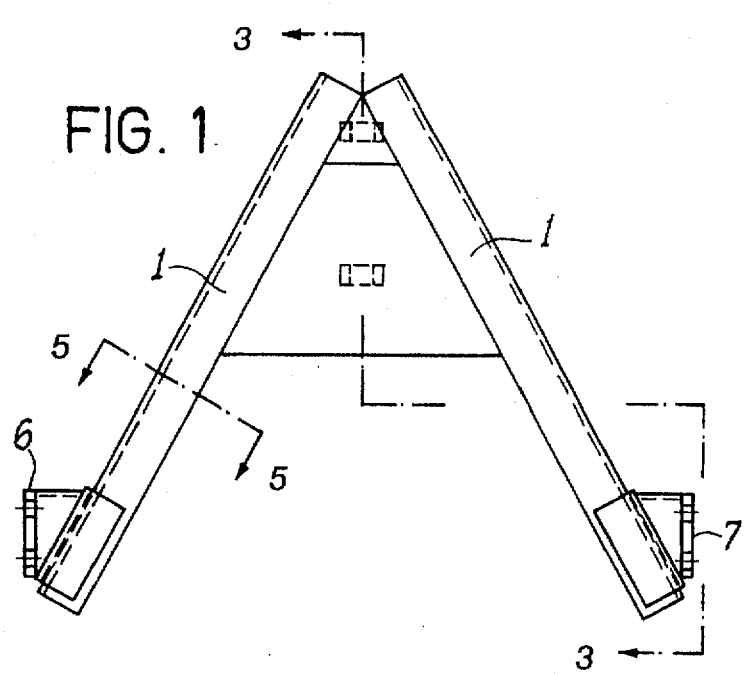
FIG. 1 is a top view of the second element of the device according to the invention.
Figure 3:
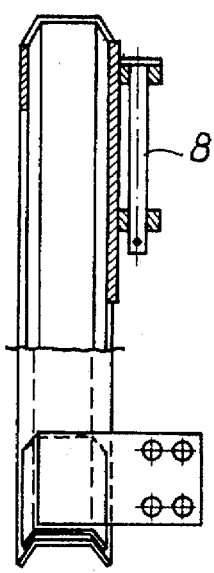
FIG. 3 is a section view along line 3—3 of FIG. 1.
Figure 2:
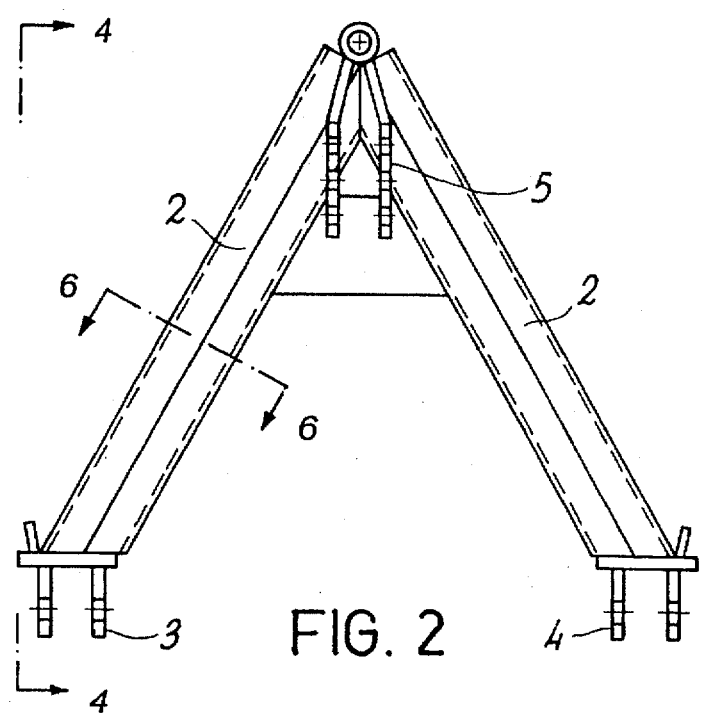
FIG. 2 is a top view of the first element of the device according to the invention.
Figure 5:
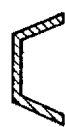
FIG. 5 is a section view along line 5—5 of FIG. 1.
Figure 6:
FIG. 6 is a section view along line 6—6 of FIG. 2.

Observing now the figures of the enclosed drawings, it can be noted that the device according to the invention is made up of two coupling triangular elements 1 (FIG. 1) and 2 (FIG. 2), realized by employing "C" shaped section bars having opened wings (see sections 5—5 and 6—6— respectively FIGS. 5 and 6), of 510 type steel, with one of the elements featuring a pair of facing C-shaped section bars coupled by electrowelding.

If the section bars have a tubular shape, obviously it is not necessary for electrowelding.

The triangular element 2 provided with male section bars is previously mounted on three points of the tractor hoister (not shown) by fixing plates 3, 4 and 5.

In view of the reduced dimensions, the triangular element 1 need not be removed in order to allow the coupling of fittings not employing the hoister (for example the trailer or the transport trolley).

The triangular element 1 having receiving or female section bars must be suitably prearranged on the tool couplings 6, 7 and 8, by suitable adapter bolted plates and/or pins (not shown); in order to obtain the maximum functionality. In view of the low costs and the simplicity of the present invention's design, each tool (plow, harrow, etc.) can be provided with a fixed female 1, element permanently mounted.

At the moment of use of the device, it is sufficient to bring the tractor near to the tool, to lift the hoister until provoking the fixed coupling of the two triangular elements 1 and 2 and the lifting from the ground of the same tool, which in view of the particular shape of the section bars, will be self-centering on the male triangular element 2 coupled to the tractor.

Figure 4:
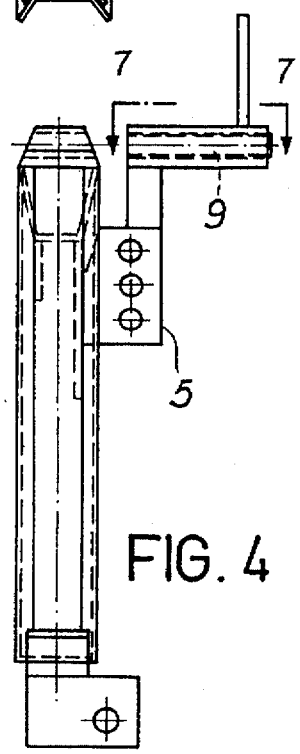
FIG. 4 is a view from the direction of line 4—4 of FIG. 2.
Figure 7:
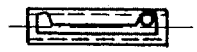
FIG. 7 is a section view along line 7—7 of FIG. 4.

In order to complete the hooking, the tractor driver, without getting off from the vehicle, will couple a latch pin 9 (see FIGS. 4 and 7) provided above on the triangular male element 2, and that will block the female triangular element 1 on the male 2, until when making the opposite operation on the latch 9 and making the contrary operations previously described, the tool will be released from the tractor.

The particular shape of the section bars of the elements 1 and 2 (section 5—5 and 6—6, FIGS. 5 and 6) guarantees the stiffness and the strength of the coupling.

To complete the full functionality of the device according to the invention, there is provided a series of adapter plates (not shown), allowing for universal use of the invention with all kinds of tractors and tools.

The present invention has been described for illustrative, but not limitative purposes, according to its preferred embodiments, but it is to be understood that modifications and/or changes can be made by those skilled in the art without departing from the relevant scope as defined in the enclosed claims.

We claim:

1. A device for quick hooking of a tool to a tractor and quick release of the tool from the tractor, comprising:

a first substantially triangular male element;

a second substantially triangular female element;

coupling and releasing means for coupling and releasing the male element with respect to the female element with said coupling and releasing means being positioned so as to be operable by an operator on the tractor;

said male element being designed for securement to the tractor and said triangular female element being designed for attachment to the tool, and said male element having a hexagonal cross-section and said female element having a cross-section which includes an outer wall with first and second wing walls which extend obtusely off from an interior surface of said outer wall such that said male and female elements are slidingly coupable to each other by the effect of the weight of the tool and are self-centering during the coupling.

2. Device according to claim 1, characterized in that said male element is comprised of a pair of C-section bars, having opened wings, which are coupled to form a hexagonal cross-sectioned tubular member.

3. Device according to claim 2, characterized in that said female element has a pair of C-shaped, open wing side sections each having an internal configuration which corresponds to an external configuration of said hexagonal tubular member to be received therein.

4. Device according to claim 1, characterized in that said male element is releasably secured to the tractor by three independent fixing plates.

5. Device according to claim 1, characterized in that said female element is releasably attached to the tool to be hooked by three independent couplings.

6. Device according to claim 5, characterized in that said attachment of the female element to the tool is realized by bolted plates.

7. Device according to claim 5, characterized in that said attachment is realized by pins.

8. Device according to claim 1, characterized in that said coupling and releasing means is comprised of a latch pin provided on said male element.

9. A self-centering assembly for quick hooking and release of farm tools, comprising:

a substantially triangular configured female element having two side section bars which diverge out from an apex region and are fixedly joined together by an intermediate member, and each of said side section bars having a C-shaped open wing cross-section which is defined by an outer wall with two wing walls extending out at an obtuse angle with respect to an interior surface of said outer wall, and said female element including means for attaching said female element with one of a tractor and a farm tool;

a substantially triangular configured male element having two male side sections which diverge out from an apex location and are fixedly joined together by a joining member extending between said male side sections, each of said male side sections featuring an exterior surface configuration which corresponds with an interior surface of a respective one of said C-shaped, open wing cross-sectioned side section bars such that said male element is slideably received, in a self-centering fashion, by said female element, and said male element including means for securing said male element with an opposite one of said tractor and farm tool than that which said female element is attached; and a latch mechanism for coupling said female and male elements so as to prevent separation of said male and female element.

10. A self-centering assembly as recited in claim 9 wherein said male side sections are tubular members comprised of interconnected first and second side section portions which portions have C-shaped, open wing cross-sections.

11. A self-centering assembly as recited in claim 10 wherein said tubular members are each hexagonal in cross-section.

12. A self-centering assembly as recited in claim 9 wherein said two side section bars of said female element each include a first end in said apex region and a second free end spaced further apart than said first ends with respect to a common plane, and said means for attaching said female element including a first independent coupling mechanism at one of said free ends and a second independent coupling mechanism at a second of said free ends so as to provide an open insertion space therebetween and to opposite sides of said common plane from said free ends inward to said intermediate member.

13. A self-centering assembly as recited in claim 12 wherein said means for attaching said female element is dimensioned and arranged for attachment to a farm tool while said means for securing said male element is dimensioned and arranged for securement with a tractor.

14. A self-centering assembly as recited in claim 9 wherein said two side section bars of said female element each include a first forward end in said apex region and a second rearward end spaced further apart than said first forward ends, and said latch mechanism includes a latch support with sliding pin, and said latch support being mounted on said male element such that said sliding pin is shiftable to a position forward of said forward ends of the two side section bars of said female element.

15. A self-centering assembly for quick hooking and release of farm tools; comprising:

a male element having two male side sections which diverge out from an apex location and are fixedly joined together by a joining member extending between said male side sections, and said male element including means for securing said male element to one of a tractor and a farm tool;

a female element having two side section bars which diverge out from a common apex region and are rigidly fixed together by an intermediate member, each of said section bars having a first, forward end in said apex region and a second rearward end, said rearward ends being spread further apart than said forward ends with respect to a common plane, and said section bars of said female element having a generally C-shaped configuration for sliding reception and weight support of respective ones of said male side sections, which sliding reception includes insertion of said male element through said open insertion space along said common plane, said female element further including means for attaching said female element to an opposite one of the tractor and the farm tool than that which said male element is secured, and said self-centering assembly further comprising a latch mechanism, which, when in locking position, includes a component that extends forward of the forward ends at the apex region of said female element and latches said male and female elements to prevent relative sliding therebetween.

16. A self-centering assembly as recited in claim 15, wherein each of said side section bars of said female element includes a C-shaped, open wing cross-section which is formed of an outer wall with two wing walls extending out at an obtuse angle with respect to an interior surface of said outer wall, and said male element being a tubular member with a side portion having a configuration corresponding to the C-shaped, open wing cross-section of said side section bars.

17. A self-centering assembly as recited in claim 15, wherein said attaching means of said female element is dimensioned and arranged for attachment to a farm tool, and wherein said securing means of said male element is arranged for securement to a tractor.

18. A self-centering assembly as recited in claim 15, wherein said latch mechanism includes a latch support with sliding pin which latch support is mounted on said male element such that said sliding pin represents said component which is shiftable to a position forward of said forward ends of the section bars of said female element.

* * * * *